US00RE46080E

(19) United States
(12) Reissued Patent
Maurer et al.

(10) Patent Number: US RE46,080 E
(45) Date of Reissued Patent: Jul. 26, 2016

(54) FILTERING APPARATUS AND FILTER ELEMENT

(71) Applicant: Hydac Filtertechnik GmbH, Sulzbach/Saar (DE)

(72) Inventors: Patrick Maurer, Sulzbach (DE); Norbert Sann, Riegelsberg (DE)

(73) Assignee: HYDAC FILTERTECHNIK GMBH, Sulzbach/Saar (DE)

(21) Appl. No.: 13/743,077

(22) Filed: Jan. 16, 2013

Related U.S. Patent Documents

Reissue of:
(64) Patent No.: 7,997,421
Issued: Aug. 16, 2011
Appl. No.: 11/629,751
PCT Filed: Mar. 4, 2005
PCT No.: PCT/EP2005/002281
§ 371 (c)(1),
(2) Date: May 8, 2007
PCT Pub. No.: WO2005/123216
PCT Pub. Date: Dec. 29, 2005

(30) Foreign Application Priority Data

Jun. 17, 2004 (DE) ..... 10 2004 029 225

(51) Int. Cl.
*B01D 35/30* (2006.01)
*B01D 27/07* (2006.01)
(Continued)

(52) U.S. Cl.
CPC ..... *B01D 29/114* (2013.01); *B01D 29/96* (2013.01); *B01D 35/30* (2013.01);
(Continued)

(58) Field of Classification Search
CPC ..... B01D 2201/291; B01D 2201/304; B01D 2201/301; B01D 2265/06; B01D 2271/022; B01D 46/0004; B01D 2201/0415; B01D 29/21; B01D 29/114; B01D 35/30; B01D 29/96
USPC ..... 210/444, 454, 440, 450, 455
See application file for complete search history.

(56) References Cited

U.S. PATENT DOCUMENTS 654,592 A * 7/1900 Barr ..... 210/323.2
2,076,304 A * 4/1937 Strindberg ..... 55/379
(Continued)

FOREIGN PATENT DOCUMENTS

DE 2706017 A1 8/1978
DE 3805138 A1 8/1989
(Continued)

OTHER PUBLICATIONS

Office Action, dated Apr. 15, 2014, for U.S. Appl. No. 13/743,077.*

*Primary Examiner* — Elizabeth McKane
(74) *Attorney, Agent, or Firm* — Wenderoth, Lind & Ponack, L.L.P.

(57) ABSTRACT

A filtering apparatus includes a pot-type filter housing (10), a filter element (28) accommodated in the housing, a holding mechanism (38) disposed in the filter housing (10) to removably fix the filter element along its longitudinal axis, and a sealing device (60) that seals between a lid (20) of the filter housing (10) and the filter element (28). The holding mechanism (38) is provided with cooperating holding elements embodied on the interior face of the filter housing (10) as well as on the filter element (28). The filtering apparatus dispenses with the need for O-seals that are known in prior art and extend in a radial direction between the filter element and the filter head as a housing lid because the sealing device (60) encompasses at least one sealing edge (62) or sealing surface placed parallel to the longitudinal axis in a radial direction and seals under the effect of the pressure applied it by the holding mechanism (38). The invention further relates to a filter element that is to be used in such filtering apparatus.

19 Claims, 3 Drawing Sheets

(51) Int. Cl.
*B01D 29/11* (2006.01)
*B01D 29/96* (2006.01)

(52) U.S. Cl.
CPC .... *B01D 2201/291* (2013.01); *B01D 2201/302* (2013.01); *B01D 2201/304* (2013.01); *B01D 2201/305* (2013.01); *B01D 2201/4092* (2013.01)

(56) References Cited

U.S. PATENT DOCUMENTS

| | | | | | |
|---|---|---|---|---|---|
| 2,524,336 | A | * | 10/1950 | Vokes | 210/131 |
| 2,747,744 | A | * | 5/1956 | Gretzinger | 210/442 |
| 2,771,156 | A | * | 11/1956 | Rohn et al. | 55/498 |
| 2,932,400 | A | * | 4/1960 | Scavuzzo | 210/235 |
| 3,027,042 | A | * | 3/1962 | Graves | 220/304 |
| 3,415,382 | A | | 12/1968 | Martin | |
| 3,489,437 | A | | 1/1970 | Duret | |
| 4,057,502 | A | | 11/1977 | Crumrine et al. | |
| 4,075,106 | A | * | 2/1978 | Yamazaki | 210/487 |
| 4,157,144 | A | * | 6/1979 | Weiler et al. | 215/252 |
| 4,157,968 | A | | 6/1979 | Kronsbein | |
| 4,257,890 | A | | 3/1981 | Hurner | |
| 4,319,897 | A | * | 3/1982 | Labadie | 55/302 |
| 4,537,429 | A | | 8/1985 | Landriault | |
| 4,610,467 | A | | 9/1986 | Reimert | |
| 4,992,170 | A | * | 2/1991 | Menon et al. | 210/321.78 |
| 5,120,337 | A | * | 6/1992 | Benzler et al. | 55/482 |
| 5,164,082 | A | | 11/1992 | Lin | |
| 5,445,734 | A | | 8/1995 | Chen | |
| 5,552,057 | A | | 9/1996 | Hughes et al. | |
| 5,753,117 | A | * | 5/1998 | Jiang | 210/232 |
| 5,817,234 | A | * | 10/1998 | Dye et al. | 210/232 |
| 5,914,414 | A | * | 6/1999 | Taomo et al. | 55/385.3 |
| 5,958,237 | A | * | 9/1999 | Cort et al. | 210/416.4 |
| 5,961,678 | A | | 10/1999 | Pruette et al. | |
| 5,985,143 | A | | 11/1999 | Lin | |
| 6,245,701 | B1 | | 6/2001 | Sato | |
| 7,077,955 | B1 | | 7/2006 | Lin | |
| 8,097,154 | B2 | | 1/2012 | Dworatzek et al. | |
| 2002/0000407 | A1 | * | 1/2002 | Seiler | 210/457 |
| 2002/0053193 | A1 | * | 5/2002 | Sugano | 55/498 |
| 2003/0178356 | A1 | * | 9/2003 | Bartkus et al. | 210/232 |
| 2004/0065602 | A1 | * | 4/2004 | Moscaritolo et al. | 210/130 |

FOREIGN PATENT DOCUMENTS

| | | | |
|---|---|---|---|
| DE | 199 04 981 | | 8/2000 |
| EP | 314963 | A2 | 5/1989 |
| EP | 0 891 214 | | 5/2001 |
| GB | 589 457 | | 6/1947 |
| GB | 953 900 | | 4/1964 |
| WO | WO2007/085247 | A1 | 8/2007 |
| WO | WO2007/085427 | | 8/2007 |

* cited by examiner

FILTERING APPARATUS AND FILTER ELEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a filtering apparatus having a cup-like filter housing, a filter element held therein, and a holding means located in the filter housing for detachable fixing of the filter element along its longitudinal axis and having holding elements which interact with one another and which are formed on the inside of the filter housing and on the filter element. A sealing means effects sealing between the housing cover of the filter housing and the filter element. The present invention furthermore relates to a filter element designed for the filter device.

BACKGROUND OF THE INVENTION

Filter devices for holding filter elements are readily available commercially in a host of embodiments. A not insignificant portion of production costs in these filter devices is for making the holding means for detachable fixing of the filter element within the housing and for the sealing means for sealing the interior of the filter element relative to the filter housing.

In the filter device described in EP 0891 214 B1, the holding means has a spring configuration of two compression springs which act against one another. By their resulting spring force, an end piece, this is located on the filter element and which acts as a sealing and holding element, is pushed onto a housing-side holding element. The holding element forms a fluid connecting branch formed on the head of the filter housing by a connecting piece which extends into the support pipe of the filter element. The comparatively complex design of the known holding means leads to high production costs. Also, the known solution is less easy to install, in that the filter element can slip unintentionally off the connecting branch or can tilt at this location when put in place. This installation difficulty leads to an adverse effect on the sealing action of the sealing means. In the known solution, the sealing means has an O-ring, preferably of rubber material, which is fixed in the radial internal recess within the end cap of the filter element. In this way, it radially effects sealing relative to the outer peripheral side of the fluid connecting branch of the housing cover or of filter head. This known sealing means with an O-ring is not suited for all fluid media, for example, not for all hydraulic liquids, poorly flammable liquids, corrosive media and for special biodegradable liquids. Depending on the chemical structure of the respective medium, a long-lasting sealing function cannot be ensured.

DE-U-299 22 488 discloses a liquid filter which is easy to install, with a cup-like filter housing, with a removable cover which closes the filter housing, and with an interchangeable filter insert which has its own filter surface. The filter insert is detachably connected to the cover as the filter head of the housing. Furthermore, the known solution has a support mandrel which extends into the filter insert as a connecting branch of a holding means. In the filter housing, connecting and holding means which are referred to as an adapter is provided for the support mandrel, which connecting and holding means are designed as holding elements in the form of retaining fingers. In the known solution, the support mandrel is detachably held in the filter insert. A first installation module has the cover, the filter insert and the support mandrel. A second installation module has the filter housing and adapter with the retaining fingers. During installation of the two installation modules, the adapter is securely connected to the support mandrel. When the filter insert is replaced, the support mandrel remains in the filter housing. In this respect, installation problems (slippage, tilting) can also arise when the filter element has to be pushed onto the support mandrel, for example, when the filter is being replaced on site, with the disadvantageous consequence that the sealing action of the sealing means is adversely affected. The sealing means formed from an O-ring in the radial direction effects support between the support mandrel of the filter housing and the inner peripheral side of the filter element. Although, in addition the support mandrel as a component of the holding means in the longitudinal axial direction parallel to the longitudinal axis of the filter element on its lower base part in a receiving groove has another gasket which is not subject to any further mechanical stress, in any case, as described above the sealing action of the sealing means between the filter element and support mandrel as a housing part is adversely affected.

EP 1 287 871 A1 discloses another filter device with a cup-like filter housing, a filter element therein and holding elements detachably securing the filter element in the filter housing. The holding elements in the known filter device are a receiver located on the filter housing with an undercut forming at least one catch surface. One end of the filter element, projecting, resilient retaining fingers with catch projections form a detachable snap connection by locking to the catch surface of the receiver. In this way, installation and replacement of filter elements can be done by simple locking and releasing of the snap connection. It is sufficient to move the filter element axially in the filter housing in the direction to the cup bottom until the snap connection snaps in place. For dismounting from the cup-shaped housing, the filter element can be simply pulled out. With the known solution, in terms of a means of non-interchangeability, the result is that only filter elements designed especially for the filter device can be used for assuming a function. For example, no other components which are formed optionally as aftermarket elements could endanger the safe use of the filter device.

On the opposite end of the filter element with parts of the holding means, the end cap of the filter element has a fluid connecting branch which can be slipped onto a connecting branch part in the housing cover or filter head. The sealing means is in turn an O-ring which extends radially between the connection parts of the cover part and filter element. In this respect the above described disadvantages also apply to the known filter device according to that European patent.

SUMMARY OF THE INVENTION

Objects of the present invention are to provide a filtering apparatus and filter element therefor guaranteeing a reliable connection of the filter element within the filter housing by the holding means, having an especially simple, structural design resulting in low production costs and easy installation, and having good sealing action and resistance to corrosive media.

These objects are basically achieved by a filter device and a filter element where the sealing means has at least one sealing edge or sealing surface. The sealing edge or sealing surface is located in the axial direction parallel to the longitudinal axis, and seals under the influence of the pressure applied thereto by the holding means. It is then possible to abandon conventional O-rings which extend between the filter element and the filter head as the housing cover in the radial direction. Nor does the sealing means have to be made from rubber materials, as in the known solutions, and is accordingly suitable for any type of fluid to be filtered, even corrosive media. Depending on the medium to be filtered in the form of a fluid, the sealing means can be stipulated to be suitably resistant in terms of its material selection. Damage to the sealing means in the various installation processes can also for the most part be avoided, even if the filter element were to be placed obliquely on parts of the holding means so as to cause tilting. In this way, long lasting operation can be ensured by the sealing means.

For use in a filter device on at least one end of the filter element, an end cap is placed. On its side facing away from the filter element, the end cap has a sealing means which, designed as a closed ring with a sealing edge or sealing surface, is arranged in the direction parallel to the longitudinal axis of the filter element. The sealing means is located outside of the actual holding means such that damage to the sealing means is avoided when the filter element is fixed by the holding means within the filter housing. By preference, the sealing means with its sealing edge is an integral component of the filter element-end cap. For the end cap configuration, and accordingly for the sealing means, a plastic or steel material is resistant with respect to corrosive media can be preferably selected. Fundamentally, it is also possible to detachably integrate the sealing means into a receiving means, for example, in the form of a receiving groove within the end cap. It is essential that via a force means which can be formed from parts of the holding means, pressing of the sealing means with its sealing edge takes place in the axial direction between the face-side end of the filter element and the housing cover or filter head. In this connection, it is also possible to additionally or alternatively arrange the sealing means on the filter head or housing cover. The sealing means then works axially in the direction of the face-side end of the filter element.

In one preferred embodiment of the filter device of the present invention, the holding means has an outer thread and an inner thread corresponding to it. The holding elements are formed from the pertinent turns of the outer and inner threads so that it is possible to connect the filter element to housing parts of the filter housing to carry fluid by a screwing-on process which is simple to carry out, or to detach them again from one another by an unscrewing process. It is unimportant whether the outer thread is assigned to the filter housing or the filter element. Based on the thread characteristic of the holding means, the indicated solutions involving pushing onto the connecting branch in the filter housing can be abandoned to facilitate installation processes. In particular, the filter element does not unintentionally slip off the connecting branch, nor does it tilt on the connecting piece configuration. This thread solution forms the force means making it possible to brace the sealing means with its sealing edge or sealing surface against parts of the filter housing, especially in the form of a cover part (filter head) and/or against the end cap of the filter element. The pressing of the sealing edge or sealing surface of the sealing means is then determined essentially by its resilience and flexibility.

With the present invention, only one specific type of filter elements can ever be inserted into the filter housing. These filter elements are specifically prepared accordingly for the indicated threaded connection approach. Thus, the insertion of aftermarket components can be avoided, as such replacement parts which, in addition to their fundamentally poor quality, also as a result of their less specific adaptation to the intended filter housing, entail tightness problems on the fluid connecting points.

In one preferred embodiment of the filter device of the present invention, the outer thread is located on the end cap of the filter element and concentrically to it. Also, the inner thread is integrated in the filter housing. Furthermore, the outer thread comprises preferably a fluid passage site in the filter element, and the filter housing is made in several parts. The inner thread is held in the housing cover (filter head) of the filter housing, and encompasses another fluid passage site. In this way, the filter element can be inserted by a classical receiver in the filter housing. By a snap-on or screw-on process of the cover on the filter housing, the fluid-carrying connection from the hydraulic circuit to the filter element is established by the thread and threaded sections. Preferably, the connecting branch of the filter element on the base side is encompassed by the sealing means.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
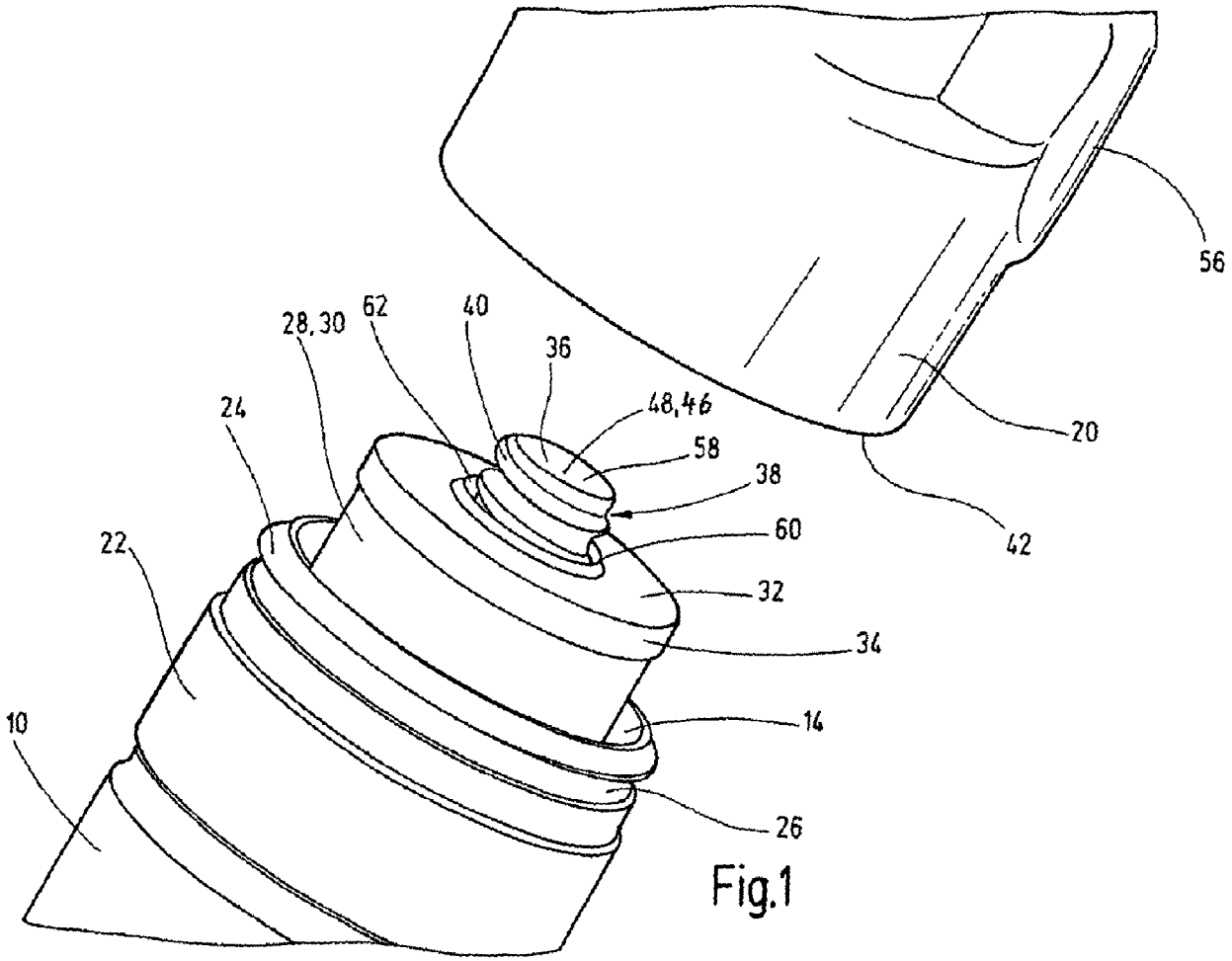
FIG. 1 is a schematic, not-to-scale, partial, perspective side view of a filter device according to one embodiment of present invention, with the cover part as the filter head screwed off.

A filter housing 10 is in the form or shape of a cup rotationally symmetrical in its outline to the longitudinal axis 12, and has one open top end 14 and a closed bottom (not shown). On the top end 14, a peripheral catch groove 16 in the form of a snap connection can be engaged by a catch overlap of the cover part or housing cover 20 of the filter housing 10, when the cover part 20 is placed on the top end 14 of the filter housing 10 by a rotary or snap motion. This snap and catch connection for the housing cover 20 with the filter housing 10 is shown especially in FIG. 3. Alternatively, as shown in FIG. 1, instead of a catch groove 16, a peripheral elevation 22 can be provided with an external threaded segment (not shown) to screw on the housing cover 20 by an internal threaded segment (not shown). In both cases, as shown in FIG. 1, in the direction of the top end 14, a projecting, peripheral sealing lug 24 at the top borders a sealing channel 26 which can house a sealing means (not shown), for example, in the form of an O-ring or the like. Optionally, sealing by the projecting sealing lug 24 without other sealing means is sufficient here.

The cup-like housing 10 is designed to hold a filter element 28 in the form of a filter cartridge conventionally having a circular-cylindrical inner support pipe with fluid passages surrounded by the filter material 30. In this embodiment, the filter element 28 should have a lower end assigned to the bottom of the filter housing and closed by a plastic end cap which also forms an enclosure for and directly engaging the facing end edge of the filter material 30.

This end cap which is not detailed can be compression molded with the support pipe in one piece from plastic. This lower end cap is closed, that is, made fluid-tight, and need only to be inserted within the filter housing 10 in the direction of its bottom, while maintaining an axial distance. It would also be conceivable here to use conventional holding and receiving means, as are known in the prior art. On its end assigned to the upper end 14 of the filter housing 10, the filter material 30 together with the support pipe is lengthened by a preferably plastic, compression-molded head cap or end cap 32 which likewise forms an edge enclosure 34 for and directly engaging the bordering edge of the filter material 30 and has a connecting branch 36. *Accordingly, the end cap 32 is integral with and formed of the same material as the connecting branch 36.*

This connecting branch 36 is part of the holding means or holder 38 having an outer thread 40 along the connecting branch 36. Corresponding thereto in the housing cover 20, set back opposite its free edge 42, an inner thread 44 is aligned in the direction of the longitudinal axis 12 of the filter device. The actual holding or holder elements 46 of the holding means 38 include of the pertinent thread turns of the outer thread 40 and inner thread 44.

Figure 2:
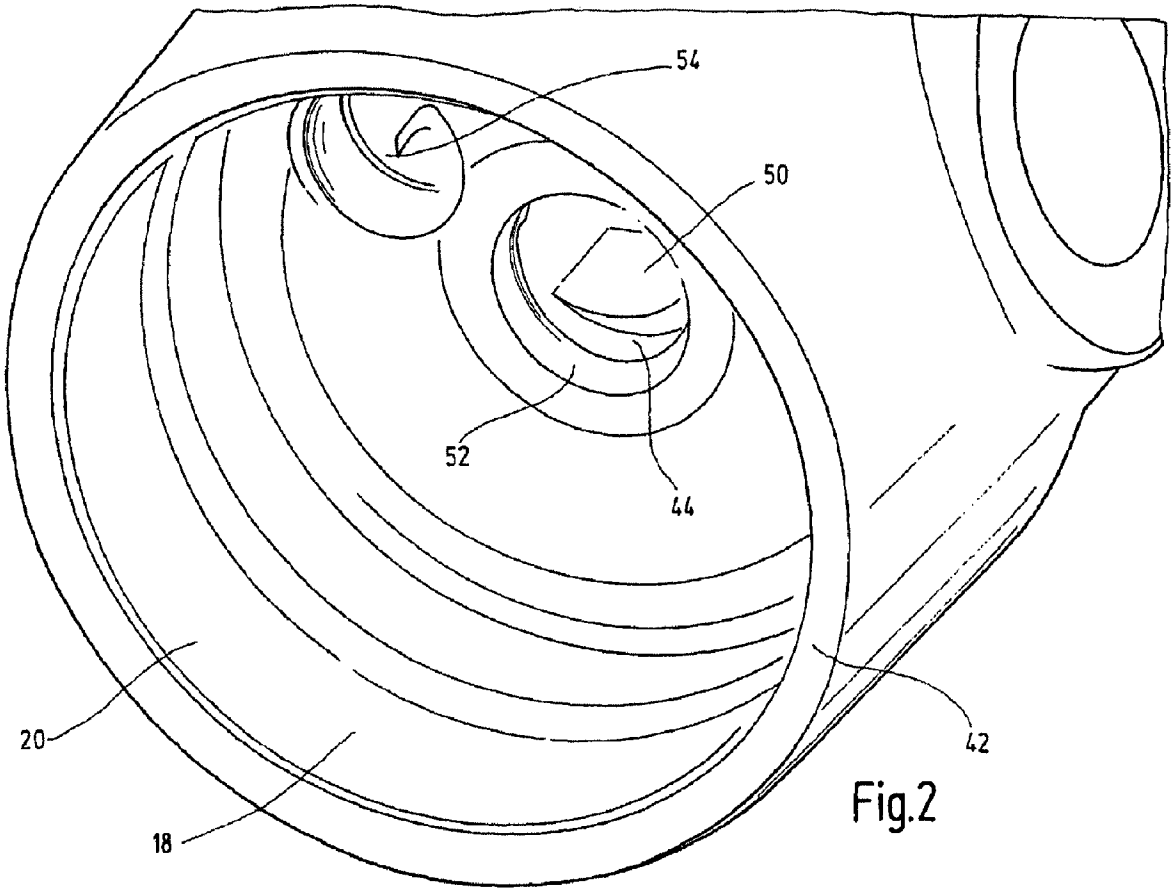
FIG. 2 is a partial, perspective bottom view of the cover part of the filter housing of FIG. 1.
Figure 3:
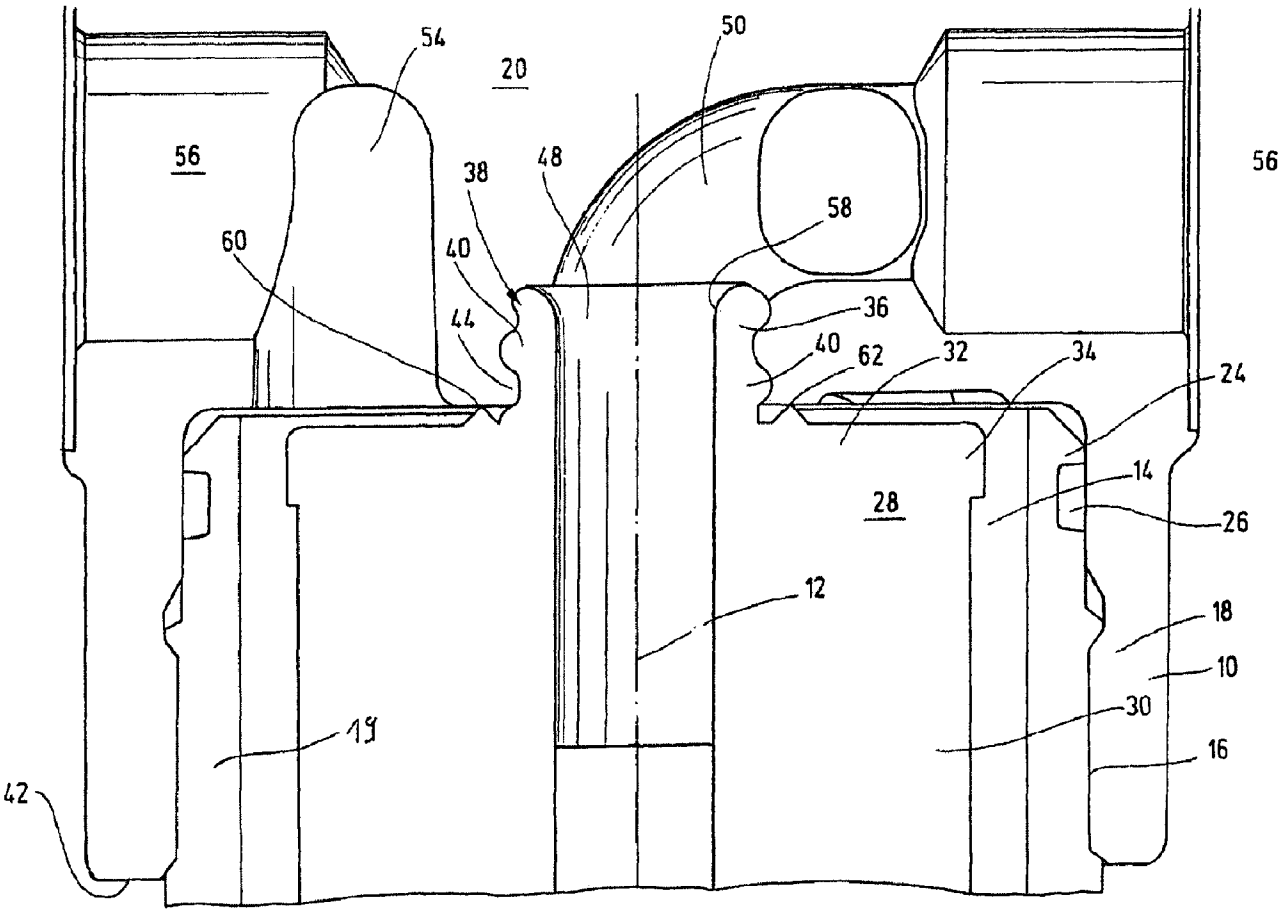
FIG. 3 is a partial, side elevational view of the top end of the filter device with the filter element inserted and the cover part in place on the otherwise cup-like filter housing of FIG. 1.

As FIG. 1 and FIG. 3 furthermore show, the outer thread 40 on the end cap 32, also referred to as the element cover, is arranged concentrically to it. The inner thread 44 is integrated in the bottom or inner part of the housing cover 20. The connecting branch 36 and accordingly the outer thread 40 concentrically encompass a fluid passage site 48 in the filter element 28. The inner thread 44 integrated in the housing cover 20 borders another fluid passage site 50. The inner threaded segment can be a component of an insert sleeve 52 (compare FIG. 2) inserted into a hole therefor in the housing cover 20, and can also be formed of a plastic material in the form of a compression or clamping sleeve. In addition to the other fluid passage site 50, the cover part 20 has a fluid inlet site 54 for the fouled fluid.

Inflowing, fouled fluid, especially hydraulic medium, travels with the housing cover 20 in place on the filter housing 10 via the fluid inlet site 54 into the interior of the filter housing 10 and then flows through the filter element 28 from outside to inside. The dirt to be removed remains in the filter material 30 of the filter element 28. The cleaned fluid has then collected within the support pipe leaves the filter housing 10 with the housing cover 20 via the fluid passage site 48 and the other fluid passage site 50. For its filter function, the filter device can be connected to a hydraulic circuit (not shown) via connecting points 56.

For an economical sealing means, it has been found to be advantageous to make the thread turns of the outer thread 40 and the mating inner thread 44 as so-called round threads. Furthermore, to ensure a stiff configuration, the connecting branch 36 is kept as small in diameter and in overall height. In particular, in diameter, it is kept several times smaller than the outside diameter of the end caps 32. To provide favorable flow conditions, moreover the free end of the connecting branch 36 is provided on the inner peripheral side with a funnel-shaped curvature 58. Furthermore, the connecting branch 36 on its base-side transition point to the end cap 32 is surrounded with a concentrically extending sealing means or seal 60. As FIG. 3 shows in particular, the sealing means 60 is made triangular in cross section and seals with a sealing edge 62 tapering in the direction of the bottom of the housing cover 20 if it is placed on the filter housing 10 (compare FIG. 3).

This sealing edge 62 can be slightly compressed if, when the housing cover 20 is fixed, it is drawn by the holding elements 46 in the form of thread turns in the direction of the filter element 28 and of the filter housing 10. The holding means 38 therefore yields a positive and nonpositive fluid connection between the filter element 28 and the housing cover 20. The sealing means 60 is nonpositively compressed in contact with the housing cover 20. *As best shown in FIG. 3, the sealing edge 62 engages a planar surface of the housing cover 20.* Because the sealing means 60 with the sealing edge 62 is located on the end cap 32 with the threaded connecting branch 36, sealing is effected between the filter element 28 and the filter head in the form of the housing cover 20. Thus, other sensitive seal materials, for example, of rubber, which are intended to ensure the sealing function in the manner of an O-ring, are omitted. Since the sealing means 60 is made of the same material as the end cap 32 and is especially an integral component of it, [the] *as is the connecting branch 36, the sealing means 60 and the connecting branch 36 are formed with the end cap 32 as one piece. The* sealing means 60 is thus suited for all hydraulic liquids, poorly flammable liquids, corrosive media and for all biodegradable liquids. Media for conventional sealing means, especially of rubber material, can no longer guarantee a sealing function over a long interval.

Since the filter element 28 is held in a defined manner by the threaded segment in the housing cover 20 and accordingly in the filter head, in mounting and dismounting processes, for example, to replace a used filter element 28 by a new one, it cannot, as in the prior art, lead to the connecting branch 36 slipping off unintentionally. Rather a precisely manageable contact situation prevails. When the housing cover 20 is locked on the filter housing 10, it is ensured that a fluid-carrying connection is also produced within the filter device. Preferably, the filter element is first screwed into the cover part for an insertion process and then it is locked to the filter housing 10. Moreover, for the filter device of the present invention, a defined filter element 28 is necessary in terms of the connection construction, so that it is not possible to insert alternative aftermarket components into the existing filter device housing which could otherwise endanger the operation of the filter device as a result of tightness problems.

The sealing means 60 is selected in terms of its overall height such that on the base-side outlet of the threaded segment of the outer thread 40 it projects as a round threaded by half a thread turn. Instead of a rounded thread, another metric thread can be used. Furthermore, several gaskets—also in another geometrical configuration—in a concentric arrangement and optionally at a different sealing height can encompass the connecting branch 36. Furthermore, it is still within the scope of the present invention to interchange the arrangement of the outer and inner threads so that then the housing 20 has the outer thread and the end cap 32 of the filter element 28 has the inner thread 44 (design not shown). In addition to the described force means in the form of threaded segments of the holding means, it is also possible to brace nonpositively, for example, by a spring element in the form of a compression spring, comparably to the solution as shown in FIG. 5 of EP 0 891 214 B1, against the connecting branch in the filter head or cover part of the filter housing and to apply a sealing force to the sealing means in the axial direction.

While one embodiment has been chosen to illustrate the invention, it will be understood by those skilled in the art that various changes and modifications can be made therein without departing from the scope of the invention as defined in the appended claims.

What is claimed is:

1. A filtering apparatus, comprising:

a cup-shaped filter housing with a housing cover;

a filter element received inside said filter housing and having an end cap on a longitudinal end thereof adjacent said housing cover;

a holder located in said filter housing [detachable] *detachably* securing said filter element to said housing cover along a longitudinal axis thereof and having holder elements interacting with one another and formed on an inside of said housing cover and on said filter element; and a seal providing a sealing effect between said housing cover and said filter element, said seal having at least one sealing surface facing in an axial direction parallel to said longitudinal axis, said seal sealing under influence of pressure applied thereto by said holder, and said seal *and said holder elements formed on said filter element all* being integral with and formed of a same material [of] *with* said end cap *as one piece*.

2. A filtering apparatus according to claim 1 wherein said holder comprises outer and inner threads on said filter element and said housing cover, with said [holding] *holder* elements being turns of said outer and inner threads.

3. A filtering apparatus according to claim 2 wherein said seal is located on said end cap concentrically to said outer thread thereon; and said inner thread is in said housing cover.

4. A filtering apparatus according to claim 3 wherein said outer thread encompasses a fluid passage in said filter element.

5. A filtering apparatus according to claim 3 wherein said filter housing comprises several parts; and said inner thread encompasses a fluid passage in said housing cover.

6. A filtering apparatus according to claim 5 wherein said seal encompasses said holder at a transition point to said filter element.

7. A filtering apparatus according to claim 2 wherein said threads are rounded threads.

8. A filtering apparatus according to claim 1 wherein said filter element comprises filter material extending along said longitudinal axis, said end cap being directly coupled on one longitudinal end of said filter material, said seal being on a side of said end cap remote from said filter material.

9. A filter element for a filtering apparatus, comprising:

filter material extending along a longitudinal axis;

an end cap mounted on one longitudinal end of said filter material having a first *axial* side facing said filter material and an opposite second *axial* side facing away from said filter material; [and]

a seal on said second *axial* side being in a shape of a closed ring with a sealing surface facing in an axial direction parallel to said longitudinal axis, and being integral with and formed of a same material [of] *with* said end cap*; and*

*a connecting branch extending in said axial direction on said second axial side and integral with and formed of a same material with said end cap,*

*said seal, said connecting branch and said end cap being formed as one piece*.

10. A filter element according to claim [8] *9* wherein said end cap comprises an outer thread on said [second side extending along a] connecting branch [encompassing] *and said connecting branch encompasses* a fluid passage in said end cap.

11. A filter element according to claim [9] *10* wherein said seal encompasses said connecting branch.

12. A filter element according to claim [8] *9* wherein said end cap is directly coupled on said filter material.

*13. A filtering apparatus according to claim 1 further comprising*

*a catch groove formed in said filter housing and a catch overlap formed in said housing cover.*

*14. A filtering apparatus according to claim 1 wherein*

*said sealing surface engages a planar surface of said housing cover.*

*15. A filtering apparatus according to claim 3 wherein*

*said seal extends in said axial direction toward said housing cover, above and to encompass at least a portion of said outer thread.*

*16. A filtering apparatus according to claim 4 wherein*

*said fluid passage comprises a funnel-shaped curvature.*

*17. A filter element according to claim 9 wherein*

*said connecting branch has an outer thread and said seal extends in said axial direction toward said outer thread, above and to encompass at least a portion of said outer thread.*

*18. A filter element according to claim 9 wherein*

*said connecting branch comprises a fluid passage having a funnel-shaped curvature.*

*19. A filter element according to claim 9 wherein*

*said seal omits rubber.*

* * * * *